Oct. 12, 1965
T. M. LACY ETAL
3,210,992
ULTRASENSITIVE FORCE AND SPEED MEASURING DEVICE
Filed Aug. 25, 1961
3 Sheets-Sheet 1
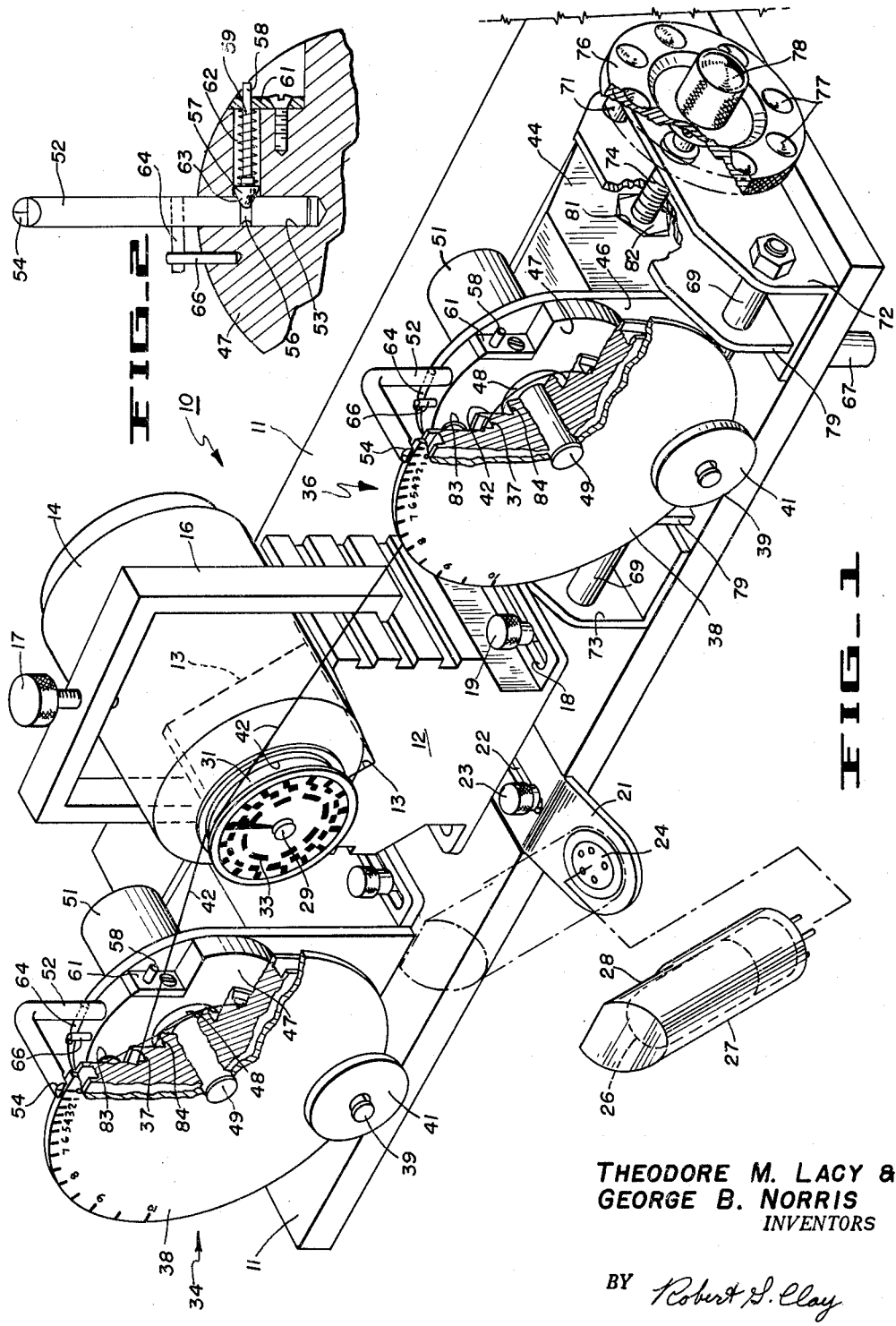
THEODORE M. LACY &
GEORGE B. NORRIS
        INVENTORS
BY Robert G. Clay
ATTORNEY

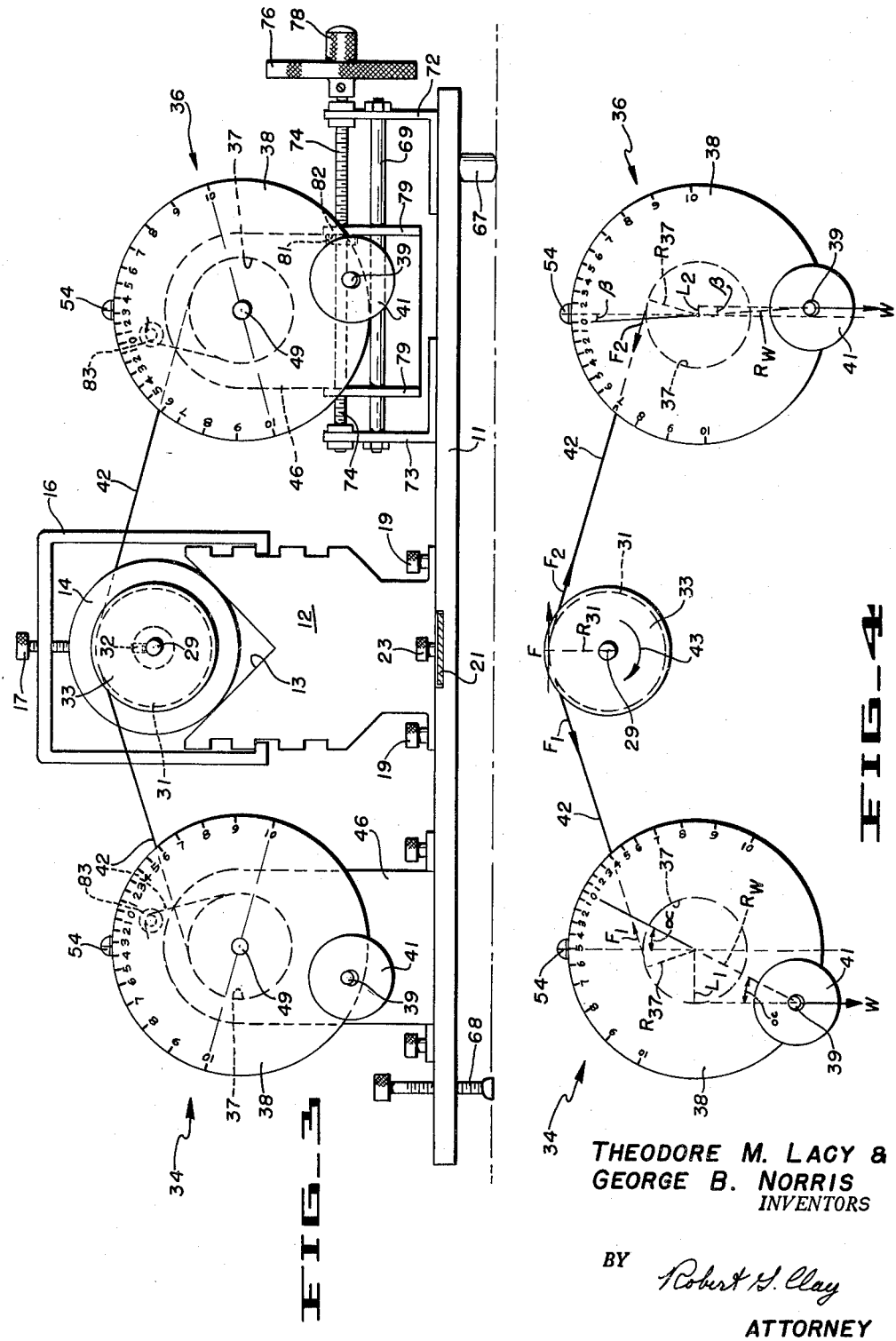

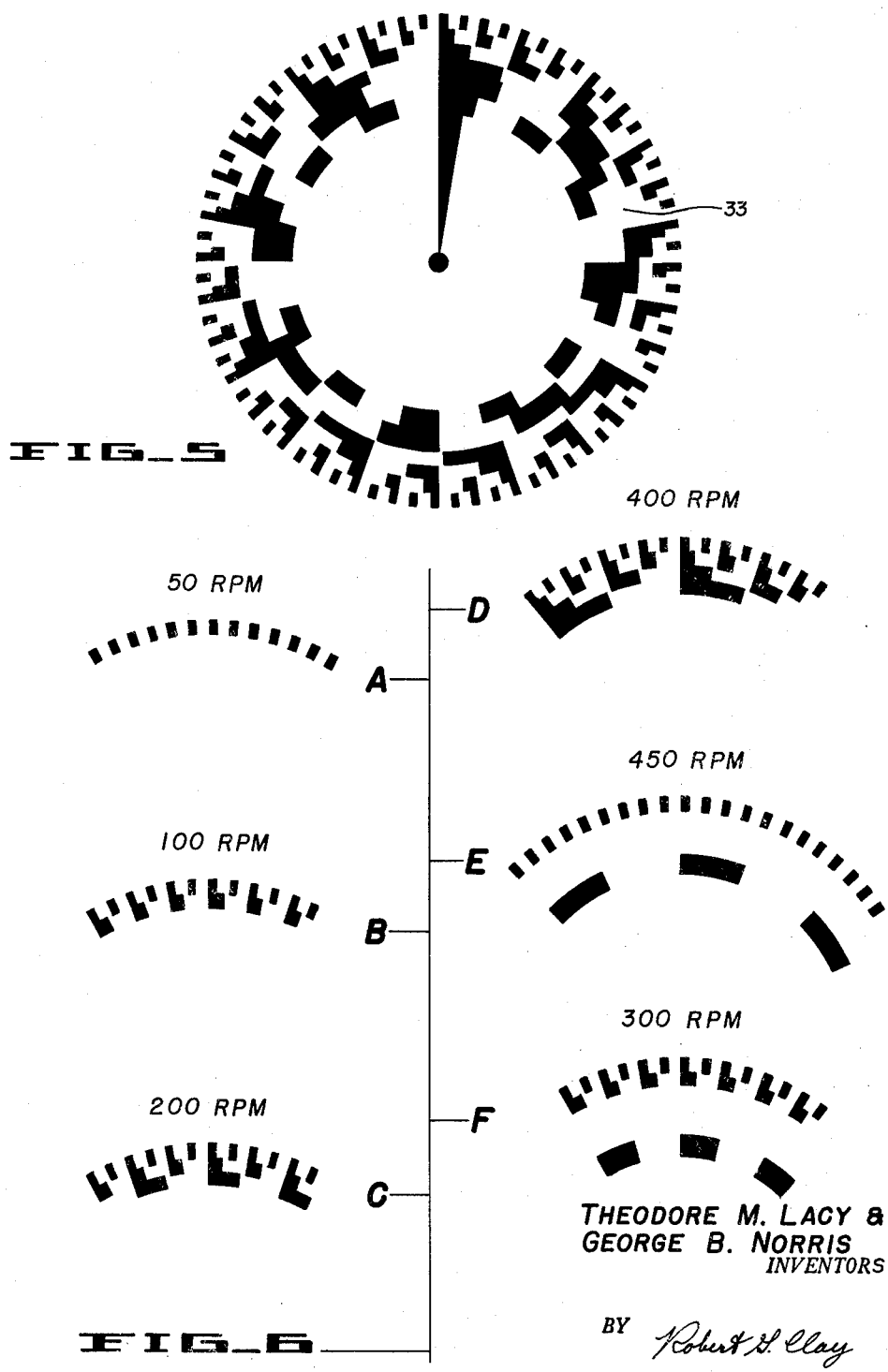

United States Patent Office 3,210,992
Patented Oct. 12, 1965

3,210,992
ULTRASENSITIVE FORCE AND SPEED MEASURING DEVICE
Theodore M. Lacy, Menlo Park, and George B. Norris, San Carlos, Calif., assignors to Ampex Corporation, Redwood City, Calif., a corporation of California
Filed Aug. 25, 1961, Ser. No. 134,001
3 Claims. (Cl. 73—135)

This invention relates to dynamometers and more particularly to the provision of an apparatus that is rugged, but still ultra-sensitive, for simultaneously measuring both speed and torque of rotating elements such as motor shafts.

Heretofore, dynamometers have had limitations in accuracy and practicability. The rotational speed of a rotating element, such as a motor shaft, was usually detected or indicated by a device that absorbed power from the rotating shaft. This made such devices impractical for the measurement of low power output motors. For example, such prior measuring device were usually connected to the shaft by a flexible coupling that not only absorbed an unmeasurable amount of power, but required extreme care in aligning the rotating shaft with the input shaft of the testing device in order to minimize losses. This resulted in inaccurate measurements, costly fixtures, and excessive amounts of time consumed in setting up the test in such measuring devices. In addition, only a few sizes and shapes of motors could be accommodated in the same measuring device.

Furthermore, such prior art dynamometers used springs to impose a load on the rotating shaft. These springs required temperature compensation for accuracy, and, where electromagnetic measuring devices were used to overcome the disadvantages involved in using springs, these too were found to be subject to variations. Another disadvantage, when either of the latter two devices were used, was that constant adjustment was required for any series of tests.

As to the measurement of speed of the rotating shaft, no satisfactory means has been found heretofore that would give an accurate and true speed measurement. There were definite limits to the speeds that could be measured, and quite often accuracy had to be sacrificed in order to accommodate the higher speed measurements. Finally, in many prior art dynamometers where extreme sensitivity for the measurement of torque was required, means were provided usually in the form of a lever with a knife type fulcrum balance. This, of course, limited such measuring devices to laboratory uses or other controlled conditions where extreme care could be taken because of the sensivity and relative fragility of the instruments.

Accordingly, a general object of this invention is the provision of a new and improved dynamometer for simultaneously and accurately measuring both speed and torque of a rotating shaft.

Another object of this invention is the provision of a new and improved dynamometer that is capable of accurately measuring the speed of a rotating shaft or element over a wide range of speeds.

Still another object of this invention is the provision of a dynamometer capable of accurately measuring simultaneously both speed and torque and especially capable of measuring the output power of shafts and engines, and particularly extremely low power output motors and the like.

Yet another object of this invention is the provision of a dynamometer capable of accurately measuring both the speed and torque of rotating shafts and the like without absorbing any power from the shaft for speed measurement.

Briefly, dynamometers in accordance with the invention may include an apparatus having a base on which is affixed a jig or like motor mounting device to which the motor to be tested may be affixed. Because it is important to know the speed at which the torque is measured, so that a speed-versus-torque characteristic can be plotted, the rotating motor shaft is provided with a disc having a selected diagram affixed thereon that is illuminated by a stroboscopic light so that a particular pattern representative of the speed of the disc is made visible to the eye. The shaft is also provided with a drum around which is wound a tension member, e.g. a strip or string that forms a braking and torque-absorbing element. The ends of the spring are attached to a pair of drums on a pair of laterally positioned parallel shafts. On each of these latter two drums is affixed a sealed disc. Each drum is provided with an eccentrically mounted weight in such manner that the weights tend to turn the two parallel shafts in opposition to each other to thus apply a torque-absorbing load to the motor shaft. When the motor shaft is stationary, these two weights are balanced against each other and, upon rotation of the shaft, the friction or resistance applied to the braking element unbalances the two weights. The unbalanced position of the two weights provides a differential reading indicative of the torque output of the motor and the sealed torque measuring discs are calibrated to give a torque reading directly.

A better understanding of the invention may be had by reference to the following description, taken in conjunction with the accompanying drawings, in which:

FIGURE 1 is a broken-away perspective view illustrating an ultra-sensitive dynamometer constructed in accordance with the present invention;

FIGURE 2 is a cross-sectional elevation view, to an enlarged scale, of a portion of the apparatus shown in FIGURE 1;

FIGURE 3 is an elevation view, to a reduced scale of a portion of the apparatus of FIGURE 1 in a position preliminary to operation;

FIGURE 4 is a diagrammatic elevation view of a portion of the apparatus of FIGURE 3 in an operating position;

FIGURE 5 is an elevation view of the stroboscopic pattern used on the disc on the shaft being tested; and FIGURE 6 is a series of elevational fragmentary views of some of the patterns that are identifiable under stroboscopic illumination of the disc.

Turning now to the drawings and in particular to FIGURE 1 thereof, it can be seen that the ultra-sensitive dynamometer 10 includes a base 11 on which is mounted a jig or motor mounting block 12 located centrally on the base. The jig 12 has a V-shaped top portion 13 to accommodate the device to be tested, such as a motor 14, or a gear train. Appropriate attaching means, including a bracket 16 and clamping screw 17, are used to affix the test motor 14 to the jig, and fastening means are provided, in the form of elongated slots 18 and bolt elements 19, to permit transverse adjustment of the jig and motor.

For measuring the rotational speed of the motor 14, there is provided a bracket 21 extending forward of the base 11 and immediately in front of the jig 12, the bracket 21 being mounted for longitudinal adjustment by means of a slot 22 and bolt 23. The bracket 21 is provided with a tube socket 24 for the reception of a stroboscopic light 26. The stroboscopic light 26 is enclosed in an outer shield assembly 27 that in turn is provided with an aperture 28 arranged to direct or permit the stroboscopic light 26 to flash toward the jig 12. When the stroboscopic light is connected to a suitable pulse generator, the stroboscopic light flashes with a predetermined repetition rate to illuminate the jig 12 for a purpose described below. In an actual operating device, a pulse generator producing sharp voltage spikes of short duration and at a repetition rate of 60 cycles per second was employed to operate the stroboscopic light.

When a motor 14 is suitably affixed in the jig 12, the motor shaft 29 is provided with a drum 31 affixed thereon in any suitable manner, as by screw means 32 (FIGURE 3), so that the drum rotates in unison with the shaft. In the specific example illustrated (FIGURE 3), drum 31 is also provided with a disc 33 of relatively thin material which rotates with the drum. One side of the disc faces the stroboscopic light 26 and the stroposcopic flashes illuminate the disc 33. As can be seen, this disc 33 is provided with a diagram (see FIGURE 5) that, in conjunction with the rotation of the disc and frequency of the flashes, indicates the speed of the shaft 29. In this manner and to a precise degree, the speed of rotation of a shaft can be measured without energy absorption. It is important that the illuminating voltage pulse be brief enough to effectively "stop" the pattern of disc 33 as seen by the eye of the operator.

As can be seen in FIGURE 1, torque indicating means are provided on each side of the jig 12 and spaced therefrom. These torque indicating means are indicated in their entirety as 34 and 36 respectively. The means 34, 36 each includes a rotatable drum 37 to which is affixed an indicating disc 38 and a balance weight pin 39 and weight 41. The middle portion of a braking string 42 is wound around the motor test drum 31 so as to provide a friction drag thereon, and the ends of the string 42 are then wound at least part way around the indicating drums 37 and secured thereto. During the initial "rigging" of the device for a test, the drums 37 and discs 38 at first tend to assume neutral positions with the balance weights 41 hanging directly below the axes of the drums 37 (FIGURE 1), and there is no appreciable tension on the string 42; but the means 36 is arranged to be laterally movable with respect to the means 34 so that a desired tension may be applied (FIGURE 3). Therefore, immediately after the string 42 is rigged upon the drums, the means 36 is moved in a direction away from the means 34. The string 42 is tensioned between the drums 37 and causes both of the drums to rotate in opposite directions (i.e., the drum of means 34 clockwise and the drum of means 36 counterclockwise) until the radii extending from the axes of the drums to the weights 41 lie at an appreciable angle to the vertical. If the test motor is not operating, the angle spoken of will be the same for each drum and weight. In this position, the tension in the string 42 is a function of the values of the weights 41 and of the moment arms of the weights about the axes of the drum 37; or in other words, a function of the sine of the angle made by the weight diameter line and the vertical center line of the disc.

When the motor is caused to operate, however, as shown by the arrow 43 in FIGURE 4, the friction between the tensioned string 42 and the test drum 31 causes the string to be longitudinally displaced to a degree that is a function of the torque absorbed by the string. The two drums 37 are both rotated through a further angle, one drum being dragged around by the pull of the string, and the other drum being moved by the attached weight in response to incipient slackening of the string on that side. It will be seen that in this operating condition, the torque absorbed by the string is a function of the difference between the two moment arms of the weights, and therefore is a function of the difference between the sines of the angles made by the two weight radii to the vertical center lines of the discs 38. Each disc 38 has a sine scale imprinted thereon and numbered from zero to ten so that a differential reading, in terms of inch-ounces for example, may be made directly, with proper consideration of course for the values of the weights 41 and other constants.

Details of the structure are as follows:

Indicating means 36 located on the right side of the jig 12, as illustrated in FIGURE 1, includes a base housing 44 to which is suitably attached an upright plate member 46. A relatively large, relatively thick bearing mounting plate 47 is attached to the plate member 46 and is bored centrally thereof to accommodate ball bearing means 48 of any conventional type of journal a shaft 49. The mounting plate 47 is provided with a tubular extension 51 extending to the rear of the plate 46, the tubular extension 51 in turn containing suitable ball bearing means (not shown) to journal and properly support the shaft 49. Shaft 49, it is noted, is disposed parallel to the test motor shaft 29 when the latter is properly mounted in the jig 12.

The torque indicating means 36 further includes a dial index assembly (FIGURES 1 and 2) which comprises a rod 52 extending upwardly from the mounting plate 47, inserted in a bore 53 formed in the mounting plate immediately over the shaft 49 and normal thereto. The rod 52 is provided at its upper end with an outwardly extending pointer 54, providing a reference or "zero" marker for the dial scale. A circumferential groove 56 in the lower end portion of the rod 52 forms part of a releasable fastening means, which in this example comprises a bullet-shaped head 57 affixed to a horizontally disposed pin 58 which head 57 is biased by a spring 59 towards the groove 56 to detachably affix the rod 52 in the aperture 53. Means are provided in the form of a plate 61 for mounting the spring 59 so as to properly spring bias the head 57 towards the groove 56 and for removably inserting the spring in its aperture 62 formed in the mounting plate 47. The groove 56 has a deeper indentation 63 mating with the head 57 in the operating position of the head. Thus, the pointer 54 can be snap-locked into operating position, and can also be turned out of the operating position and to the side to clear the way for attachment of the string 42 during initial rigging of the apparatus. A pair of limit stop pins 64 and 66 are also provided, extending respectively from the rod 52 and plate 47, to stop the pointer 54 in its operating position. The rod 52 can be entirely removed by pulling outwardly on the pin 58 and lifting the rod.

After the motor 14 has been mounted on the device, and before the string 42 is wound thereon, the discs 38 are balanced to read "zero" at the pointers 54. This action is accomplished by means of an adjustable three-point suspension for the base plate 11, including a pair of spaced feet 67 (FIGURES 1 and 3) extending downwardly from the zone of indicating means 36, and a single screw-adjustable foot member 68, extending downward from the zone of indicating means 34.

When the string 42 is first wound upon the drum 31 and is attached to the torque indicating means 34 and 36, the indicating means are in a neutral position. As previously explained, it is necessary to pre-load the indicating means 34 and 36 before beginning operation, and to this end, the torque indicating means 36 has means for changing or adjusting its relative lateral or horizontal position with respect to the jig 12. For this adjustment, the mounting means for the torque indicating means 36 comprises a pair of parallel rods 69 and 71 (FIGURES 1 and 3) that are mounted parallel to the base 11 but spaced therefrom by a pair of flanged plates 72 and 73 spaced apart sufficiently to permit lateral movement of the indicating means. The base housing 44 is provided with horizontal apertures to permit the housing 44 to slide on the rods 69 and 71. A traverse screw 74 is mounted parallel to the rods 69 and 71 and rotatably affixed in the flanged plates 72 and 73. An adjusting wheel 76, provided with finger-tip depressions 77 as a means for rotating the wheel to make fine adjustments, is coupled to one end of the traverse screw 74. A knurled knob or center hub 78 is also coupled to the wheel 76 for fast, large-order adjustments. The periphery of the wheel 76 is also knurled for making fine adjustments. A pair of inner traverse plates 79 are affixed to the housing 44 and are apertured, as at 81, to secure a loosely-mounted nut 82 that is threaded on the traverse screw 74. The plates 79 are attached to the base 44 with the nut 82 mounted in a loosely conforming recess in the base 44 so as to be snugly fitted between the base and the plate, but free for very slight rotational movement with respect thereto. Thus, by turning the handle 76, the base 44 and hence the entire indicating means 36 may be moved toward and away from the jig 12, with the loose mounting of the nut 82 providing a precision, non-binding bearing for the threaded screw 74.

The torque indicating disc 38 is mounted on the shaft 49 and is affixed to the drum 37. The disc 38 is provided with the pin 39 of a predetermined weight (e.g., ten grams) upon which the additional weights 41 of predetermined amounts may be detachably affixed. As illustrated in FIGURE 3 the disc 38 is in its torque loading position and balanced against a weight of similar amount but on the opposite side of the disc in the torque indicating means in 34.

The other torque indicating means 34 located on the left-hand side of the jig 12 (as viewed in FIGURE 3) is also provided with an indicating disc 38, but it is to be noted that the pin 39 and weights 41 associated herewith are balanced on the opposite side of the disc, so that the disc is biased to turn anti-clockwise due to gravity. Because the torque indicating means 34 is identical in its function and operation to the torque indicating means 36, like parts having the same function and operation are given the identical identification numbers, no further description herein being deemed necessary for the understanding of its operation. It is to be noted, however, that this torque indicating means 34 is immovably attached to the base 11. Thus change of the load varying means is accomplished solely by movement or positioning of torque indicating means 36 as previously described.

The torque-absorbing brake means for the dynamometer 10 comprises the string 42 with its ends affixed to each of the indicating means 34 and 36 and with suitable length so that the center thereof can be wrapped around the drum 31 in the manner shown in FIGURE 3. The ends of the string 42 are affixed to each of the indicating means 34 and 36 by dished spring washer pins 83, mounted adjacent the peripheries of the drums 37, both of which are affixed to and immediately behind their respective torque indicating discs 38. In the illustrated example, (FIGURE 1), a second set of drums 84, are provided at lesser diameter, for convenient use to give measurements of a different scale of magnitude.

Thus from the foregoing, it can be understood that when the discs 38 indicate zero torque load with the shaft 29 stationary (FIGURE 3), the opposed weights (that is, either the pins 39 or a combination of pins 39 and weights 41) are said to be balanced against one another. Upon rotation of the shaft 29 of the motor being tested (FIGURE 4) the weights apply a selected frictional force to the drum 31 through the string or braking element 42, but nevertheless permit rotation of the drum 31. The braking effect of the string is a measure of the torque output of the motor which is in opposition to the friction force applied. As a result, the rotating shaft 29 pulls against one of the weights causing it to change its position. The other disc, of course, also moves in the same direction retaining a tension on the string 42 so that the friction applied is continuously uniform. If the discs are moved too much by the rotating shaft so that one of the weights no longer can bias the string to maintain a friction on the shaft, then, of course, additional weights may be applied or the indicating means 36 may be moved further away from the jig, or both.

Movement of the indicating means 36 is accomplished by the adjusting means previously described. Thus, the rotational moments of the weights tend to balance one another in a new position with the braking means being opposed by the increased moment on one of the discs by reason of its greater distance from a vertical line passing through the center of the shaft upon which it is mounted. The difference in the position of the weights in their new position of balance, being a function of the torque output of the motor, produces a differential reading that may be read directly by a suitable scale such as illustrated in FIGURE 1 on the discs 38. The pointer 54, previously referred to, is used to conveniently indicate the various positions of the weights during measurement.

As an example of a typical torque measurement on the device, the arrangement of FIGURE 4 is presented, in which the test motor is rotating in a clockwise direction, and in which the two torque indicating means 34 and 36 are balanced to read "5" and "1" respectively. In this arrangement, let $T$ = torque delivered to drum 31 by test motor;
$F$ = frictional braking force exerted by string 42 on drum 31;
$F_1$ = force exerted by string 42 on drum 37 of means 34;
$F_2$ = force exerted by string 42 on drum 37 of means 36;
$R_{31}$ = 1 inch = radius of drum 31;
$R_{37}$ = radius of each drum 37;
$W$ = 5 oz. = total weight on each means 34, 36, including both pin 39 and weight 41;
$R_w$ = $2R_{37}$ = radius at which each weight $W$ is suspended;
$L_1$ = moment arm of weight $W$ on means 34;
$L_2$ = moment arm of weight $W$ on means 36;
$\alpha$ = angle made with vertical by $R_w$ of means 34;
$\beta$ = angle made with vertical by $R_w$ of means 36.

It will be seen that in the balanced condition of forces obtaining in the apparatus, $$F_1 = F + F_2$$

$$F = \frac{T}{R_{31}}; F_1 = \frac{WL_1}{R_{37}} = \frac{2WL_1}{R_w}; F_2 = \frac{WL_2}{R_{37}} = \frac{2WL_2}{R_w}$$

and

But $$\frac{T}{R_{31}} = 2W\frac{L_1}{R_w} - 2W\frac{L_2}{R_w}$$

$$\frac{L_1}{R_w} = \sin \alpha$$

and $$\frac{L_2}{R_w} = \sin \beta$$

Therefore, $T = 10 \sin \alpha - 10 \sin \beta$.

The scales of the two discs 38 are laid off in units representing $10 \sin \alpha$ and $10 \sin \beta$, so that in the illustrated example $10 \sin \alpha$ is read directly as "5" and $10 \sin \beta$ is read directly as "1"; and $$T = 5 - 1 = 4 \text{ inch-ounces}$$

Thus, so long as the weights $W$ are each 5 ounces, the torque delivered can be read directly as the difference between the readings of the scales. For greater torque ranges, the weights $W$ may be increased, and the scale differential reading is multiplied in suitable proportion.

Turning now to the speed measurement of the shaft 29, a precise indication of shaft speed is obtained from rotation of the disc 33 and illumination of its pattern by the stroboscopic light 26. For example, with the disc 33 provided with a diagram as shown in FIGURE 5 and with a 60 cycle per second flash rate frequency stroboscopic light illuminating the diagram, the rotating diagram will provide various visual patterns that appear to be stopped by the light at various corresponding rotational speeds, as illustrated by way of example in FIGURE 6. If the speed of the shaft is not an exact multiple or submultiple of the pattern producing speed, the pattern will appear to rotate, and the precise shaft speed can be determined to the nearest revolution per minute by timing the apparent rotation of the pattern. With practice, an observer can thus measure very accurately the speed of the shaft and as is apparent there is no top limit of speeds which may be measured by such a device.

Thus, it can be seen that with the dynamometer constructed in accordance with the teachings of this invention, very accurate speed measurements and torque measurements at particular speeds can be made. Because the speed measurements do not in themselves require torque output, the torque output measured simultaneously by the torque indicating means will be a true torque measurement of the motor at the speed indicated. Also, because weights are used instead of springs no temperature compensation is required. Further means may be provided to reduce any frictional losses in the torque indicating means. For example, the means to reduce the friction in the torque indicating means may comprise an electro-magnetic vibrator (not shown) of any conventional type arranged so that with alternating current and with the vibrator rigidly attached to and located within the housing 44 a soft vibration is transmitted to the bearings of tubular extension 51. In effect, the bearings are thus kept in slight movement so that there is minimum static friction between them and the shafts journaled therein.

While the above description of this invention is in connection with the drum 31 affixed to the shaft being tested, for certain applications this drum can be omitted. When such a drum is omitted, however, means must be provided for attaching the disc 33 to the rotating shaft. This can be accomplished with any suitable and conventional attaching means, or the diagrams can be printed on gummed labels and affixed directly to the end of the shaft.

As an alternative, the indicating means 34 may be detached and the means 36 used alone. Also, the device to be tested need not be mounted in the jig, and the apparatus may be attached directly to measure torque in motors, turntables and idlers mounted in their operating chassis.

While various alternative arrangements have been pointed out in conjunction with the several elements and relationships, it will be appreciated that the invention is not confined thereto. Accordingly, the invention should be considered to include all modifications and variations falling within the scope of the appended claims.

What is claimed is:

1. In an apparatus for simultaneously measuring the speed and torque of a rotating element, the combination comprising, stroboscopic means arranged to measure the speed of rotation of a said rotating element, elongate flexible brake means wrapped around and frictionally engaging said rotating element between the ends of said brake means, a pair of shafts, means mounting said shafts parallel to said rotating element, weight means attached to the ends of said brake means, means mounting said weights eccentrically on said shafts so that said weights tend to rotate said shafts in opposition to one another, said weights being balanced when said rotatable element is stopped and unbalanced when said rotatable element is rotating, means forming part of said last mentioned means for measuring the resistance applied to said rotating means by showing the position of said weight means in terms of the torque output of said rotating means.

2. Apparatus as characterized in claim 1, wherein at least one of said means mounting said shaft is movable toward and away from the other shaft mounting means, and includes a threaded nut secured against axial movement with respect to said one shaft mounting means but free for limited rotation with respect thereto, and a screw threaded into said nut for positioning said one shaft mounting means with respect to the other.

3. In an apparatus for measuring the torque of a rotating element, the combination comprising: elongate flexible brake means wrapped around and frictionally engaging said rotating element between the ends of said brake means, a pair of shafts and mounting means therefor, weight means attached to the ends of said brake means, means mounting said weights eccentrically on said shafts so that said weights tend to rotate said shafts in opposition to one another, said weights being balanced when said rotatable element is stopped and unbalanced when said rotatable element is rotating, means forming part of said last mentioned means for measuring the resistance applied to said rotating means by showing the position of said weight means in terms of the torque output of said rotating means.

References Cited by the Examiner

UNITED STATES PATENTS

| 397,352 | 2/89 | Gaertner | 73—135 X |
| 1,786,173 | 12/30 | Scharpenberg | 73—136 X |
| 1,878,658 | 9/32 | Aronoff | 324—70 X |
| 2,122,765 | 7/38 | Weiler | 73—59 |
| 2,378,614 | 6/45 | Zahn | 73—9 |
| 2,800,792 | 7/57 | Goodhue | 73—135 |
| 2,911,822 | 11/59 | Frazier et al. | 73—135 X |
| 2,947,168 | 8/60 | Yang | 73—136 |

FOREIGN PATENTS 94,718    11/97    Germany.

OTHER REFERENCES

Koleff: K 24900 IX, German application, Oct. 25, 1956, 73–135.

RICHARD C. QUEISSER, *Primary Examiner.*

ROBERT EVANS, *Examiner.*